United States Patent [19]

Sutton

[11] Patent Number: 5,667,272
[45] Date of Patent: Sep. 16, 1997

[54] VEHICLE PLATFORM ASSEMBLY

[76] Inventor: Michael Sutton, 2811 Edwin Jones Dr., Charlotte, N.C. 28269

[21] Appl. No.: 556,139

[22] Filed: Nov. 9, 1995

[51] Int. Cl.$^6$ ..................................................... A47B 83/02
[52] U.S. Cl. ................. 297/140; 297/188.06; 297/188.2; 108/44
[58] Field of Search ..................................... 297/140, 135, 297/188.04, 188.06, 188.1, 188.2; 248/444, 309.1, 346.06; 108/44

[56] References Cited

U.S. PATENT DOCUMENTS

| | | | |
|---|---|---|---|
| 2,741,521 | 4/1956 | Bell et al. | 108/44 |
| 3,031,242 | 4/1962 | Sawle | 297/135 |
| 4,770,107 | 9/1988 | Miller | 297/135 |
| 4,995,322 | 2/1991 | Frederick | 108/44 |
| 5,046,433 | 9/1991 | Kramer et al. | 297/188.06 |
| 5,269,229 | 12/1993 | Akapatangkul | 108/44 |
| 5,443,018 | 8/1995 | Cromwell | 108/44 |

*Primary Examiner*—Peter R. Brown
*Assistant Examiner*—Anthony D. Barfield
*Attorney, Agent, or Firm*—Adams Law Firm, P.A.

[57] ABSTRACT

A platform assembly is provided for use in combination with a vehicle including a vehicle seat having a seat bottom, seat back, and a head rest. The platform assembly is supported by the seat to carry articles for ready access by an occupant of the vehicle. The platform assembly includes a platform defining a flat slip-resistant surface area for supporting articles thereon, and for preventing substantial shifting of the articles while the vehicle is in motion. An adjustable attachment strap is secured to a back end of the platform, and extends upwardly from the platform adjacent to the seat back for removable attachment to the headrest. The attachment strap permits leveling adjustment of the platform, and unobstructed access by the vehicle occupant to the articles supported on the platform.

6 Claims, 4 Drawing Sheets

VEHICLE PLATFORM ASSEMBLY

TECHNICAL FIELD AND BACKGROUND OF THE INVENTION

This invention relates to a platform assembly for a vehicle seat. The invention is provided for carrying articles for ready access by an occupant of the vehicle, such as the vehicle driver, without substantial shifting of the articles while the vehicle is in motion. The articles may be a portable computer, telephone directory, work file, fast food items, or the like.

U.S. Pat. No. 3,828,994 issued to Hollins discloses a prior art support device for transporting articles in the front seat passenger-side of a vehicle. The Hollins support includes a flat platform with a rear edge portion for being wedged into a crevice of the seat between the seat bottom and the seat back. A support strap extends through spaced-apart openings formed in opposite front corners of the platform, and loops around the head rest of the seat to hold the platform in a slightly upwardly tilted condition. The platform is intended to carry packages, such as groceries, for transport.

The present invention is useful both for transporting articles and for permitting ready access to the articles by the vehicle driver. The upwardly tilted condition of the platform in Hollins will tend to shift the articles in a direction towards the seat back, thus making it awkward for the driver to quickly and easily access the articles while the vehicle is momentarily stopped, such as in traffic or at a traffic signal. Furthermore, the strap of Hollins extends generally diagonally from the seat head rest to the front end of the platform, and provides a further obstacle to the driver for quickly accessing the articles.

The present invention addresses these and other problems of the prior art by providing a platform assembly which is supported in a relatively level condition on the seat of the vehicle, and which allows quick and unobstructed access to the articles by the vehicle driver. The invention includes a raised border and a slip-resistant surface to prevent substantial shifting of the articles while the vehicle is in motion. Articles can be carried in a safe and stable condition on a front end of the platform, thus allowing the driver of the vehicle to simultaneously access the articles while keeping a close eye on traffic or a traffic signal as the vehicle is momentarily stopped. The raised border further prevents any loose articles from rolling off the edge of the platform, and onto the floor of the vehicle.

Moreover, the present platform assembly functions as a temporary work desk for the driver when the vehicle is parked, for example, outside of a restaurant or in the parking lot of an office building. This enables the driver to conveniently eat while working within the parked vehicle, or to make last minute preparations for a business meeting. The invention further includes a cut-out section for accommodating a cellular telephone assembly mounted within the vehicle.

SUMMARY OF THE INVENTION

Therefore, it is an object of the invention to provide a vehicle platform assembly supported by a vehicle seat for carrying articles.

It is another object of the invention to provide a platform assembly for carrying articles which permits ready and convenient access to the articles by the vehicle occupant.

It is another object of the invention to provide a platform assembly which functions as a temporary work desk when the vehicle is parked.

It is another object of the invention to provide a platform assembly which is maintained in a relatively level condition on the seat.

It is another object of the invention to provide a platform assembly for carrying articles which allows a driver of the vehicle to quickly access the articles while maintaining a close eye on traffic or a traffic signal as the vehicle is momentarily stopped.

It is another object of the invention to provide a platform assembly for carrying articles which prevents substantial shifting of the articles while the vehicle is in motion.

It is another object of the invention to provide a platform assembly which prevents any loose article from rolling off the platform and onto the floor of the vehicle.

It is another object of the invention to provide a platform assembly which is relatively inexpensive to manufacture.

It is another object of the invention to provide a platform assembly which includes a foldable leg to permit convenient transport and storage.

It is another object of the invention to provide a platform assembly which includes a cut-out section for accommodating a cellular telephone assembly mounted on the floor of the vehicle.

It is another object of the invention to provide a platform assembly which provides enhanced support strength in an area of the platform closer to the vehicle occupant.

These and other objects of the present invention are achieved in the preferred embodiments disclosed below by providing a platform assembly for use in combination with a vehicle including a vehicle seat having a seat bottom, seat back, and a head rest. The platform assembly is supported by the seat to carry articles for ready access by an occupant of the vehicle. The platform assembly includes a platform defining a flat slip-resistant surface area for supporting articles thereon, and for preventing substantial shifting of the articles while the vehicle is in motion.

An adjustable attachment strap is secured to a back end of the platform, and extends upwardly from the platform adjacent to the seat back for removable attachment to the headrest. The attachment strap permits leveling adjustment of the platform, and unobstructed access by the vehicle occupant to the articles supported on the platform.

According to one preferred embodiment of the invention, a slot is formed in the back end of the platform for receiving an end of the attachment strap. The slot is off-set from a center of the platform in a direction closer to the occupant, whereby the attachment strap provides enhanced support and stability for carrying articles in an access area of the platform closer to the occupant.

According to another preferred embodiment of the invention, the platform includes a raised border located around a perimeter thereof for holding the articles on the platform while the vehicle is in motion, and for preventing any loose articles from rolling off the platform.

According to yet another preferred embodiment of the invention, a vertical leg is connected to a bottom side of the platform at a front end thereof for being positioned on a floor of the vehicle.

According to yet another preferred embodiment of the invention, pivot means are provided for pivotally connecting the vertical leg to the bottom side of the platform.

According to yet another preferred embodiment of the invention, locking means engaging the pivot means are provided for locking the vertical leg in a fixed position at a predetermined angle relative to the platform.

According to yet another preferred embodiment of the invention, a vertically adjustable foot is connected to a bottom end of the leg for adjusting the height of the leg, and for cooperating with the strap to provide further leveling adjustment of the platform.

According to yet another preferred embodiment of the invention, a cellular telephone assembly including a telephone mounting structure is attached to a floor of the vehicle adjacent to the vehicle seat for supporting a telephone thereon. The platform defines a cut out therein to accommodate the mounting structure and telephone.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
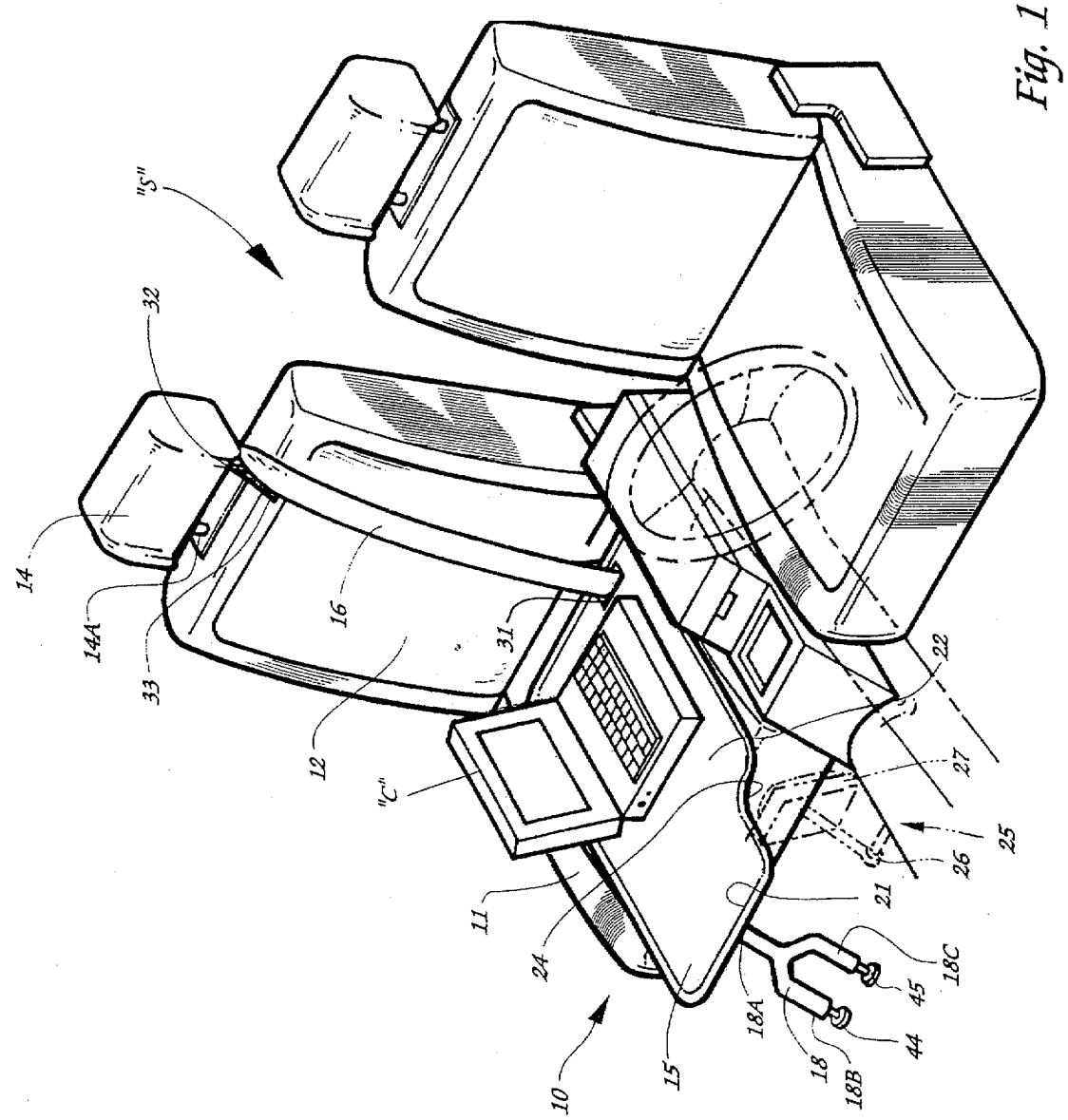
FIG. 1 is an environmental perspective view of the platform assembly according to one preferred embodiment of the invention, and showing the platform assembly positioned on the seat of a vehicle.

Referring now specifically to the drawings, a platform assembly for a vehicle seat "S" according to the present invention is illustrated in FIG. 1 and shown generally at reference numeral 10. The vehicle seat "S" includes a seat bottom 11, seat back 12, and a head rest 14. The platform assembly 10 is positioned on the vehicle seat "S" to carry articles for ready access by an occupant of the vehicle, such as the vehicle driver, or for safely transporting the articles in a position closely adjacent to the vehicle occupant. The articles may be a portable computer "C" (See FIG. 1), a telephone directory, work file, fast food items, or the like.

As shown in FIGS. 1–4, the platform assembly 10 includes a platform 15 for being located adjacent to the seat bottom 11 in a level condition, an adjustment strap 16 secured to a back end of the platform 15, and a support leg 18 pivotally connected to a front end of the platform 15. The platform 15 includes a raised border 21 extending along its entire perimeter, and a substantially flat, slip-resistant surface 22 for preventing shifting of the articles while the vehicle is in motion. According to one embodiment, the platform 15 and raised border 21 are integrally formed together of a molded plastic material, such as ABS, with the border 21 extending approximately 1–2 cm above the top surface of the platform 15. In an alternative embodiment, the platform 15 is constructed of wood with the border 21 being separately applied using an adhesive or other attachment means.

The slip-resistant surface 22 is preferably created using a thin, rough-textured rubber matting adhered to the top surface of the platform 15, and encompassing the entire surface area of the platform 15 located within the raised border 21. The thickness of the rubber matting is about 1–3 mm. Other suitable materials such as self-adhering textured strips, coatings, or layers are also applicable for creating the slip-resistant surface 22 of the platform 15.

In addition, the platform 15 may include a cut-out section 24 for accommodating the space required for a cellular telephone assembly 25. As shown in FIG. 1, the telephone assembly 25 includes a mounting structure 26 attached to a floor of the vehicle adjacent to the vehicle driver seat, and a telephone 27 carried by the mounting structure 26.

Figure 4:
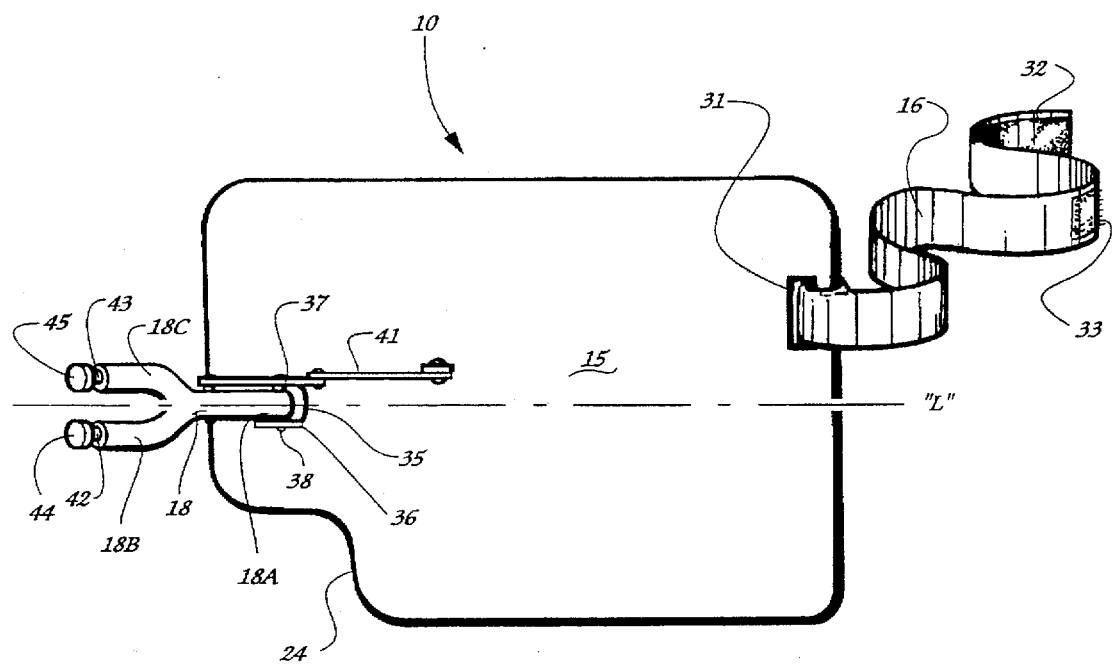
FIG. 4 is a bottom plan view of the platform assembly.

As best shown in FIGS. 1 and 4, the adjustment strap 16 is fixedly received into a slot 31 formed in the back end of the platform 15. Preferably, the slot 31 is located slightly off-center relative to a notional centerline "L" (See FIG. 4) in a direction closer to the vehicle driver to enhance the stability of the platform 15, and to provide increased support strength in an access area of the platform 15. The "access area" of the platform 15 is defined herein as that portion of the platform 15 extending generally from the centerline "L" towards the vehicle driver or occupant-user of the platform 15. According to one embodiment, the width of the platform 15 is approximately 75 cm with the slot 31 being located about 10 cm off-center.

Preferably, the adjustable strap 16 is formed of a durable nylon material with complementary hook and loop fastener portions 32 and 33 located on a free end of the strap 16. The strap 16 extends upwardly from the back end of the platform 15 along a front surface of the seat back 12, and releasably attaches to one or both vertical support bars 14A and 14B of the headrest 14 by looping the free end of the strap 16 around the vertical support bar 14A, 14B, and mating the hook and loop fastener portions 32 and 33 of the strap 16 together. The length of the strap 16 is therefore readily adjustable to permit proper leveling adjustment of the platform 15.

Figure 5:
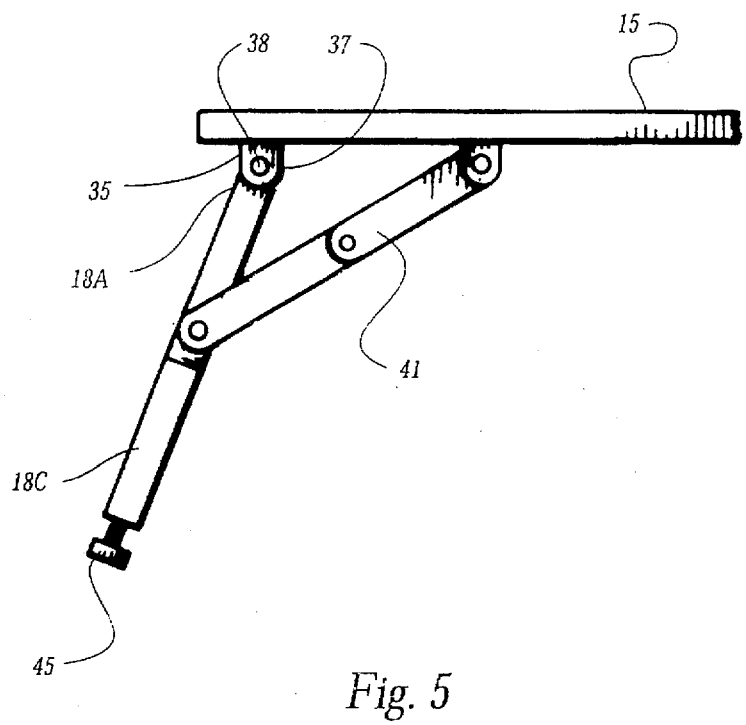
FIG. 5 is a fragmentary side elevational view of the platform and support leg of the platform assembly with the support leg in an extended position.
Figure 6:
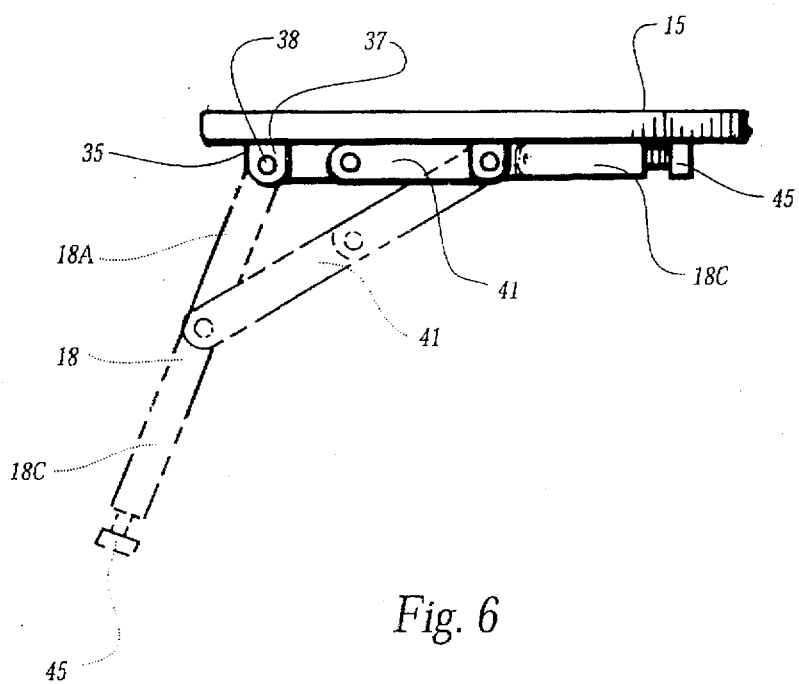
FIG. 6 is a fragmentary side elevational view of the platform and support leg of the platform assembly with the support leg in a folded position.

The front support leg 18 of the platform assembly 10 defines a generally inverted "Y" shape, and is connected to a bottom side of the platform 15 by means of a pivot bracket 35. The pivot bracket 35 includes spaced-apart opposing side flanges 36 and 37, and a shaft 38 which passes through a top end 18A of the support leg 18. A hinged pivot arm 41 is connected to the support leg 18 and to the bottom side of the platform 15 to allow inward folding of the support leg 18 for convenient transport and storage of the platform assembly 10. FIGS. 5 and 6 illustrate the support leg in the extended and folded positions, respectively. Preferably, the pivot arm includes locking means (not shown) for releasably locking the pivot arm in one of several fixed positions.

Figure 2:
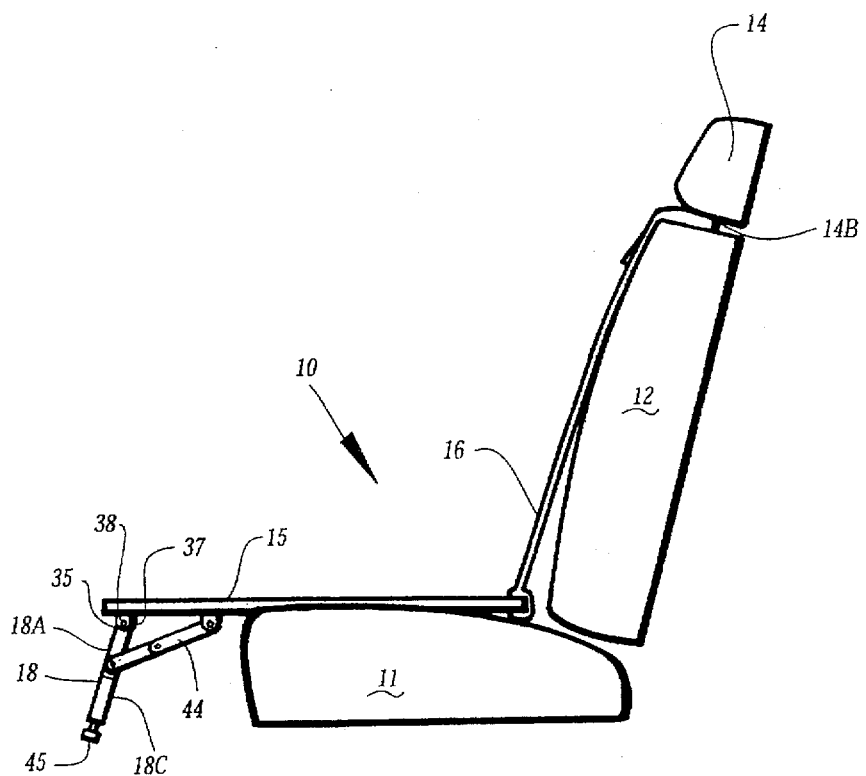
FIG. 2 is a side elevational view of the platform assembly positioned on the seat of the vehicle.
Figure 3:
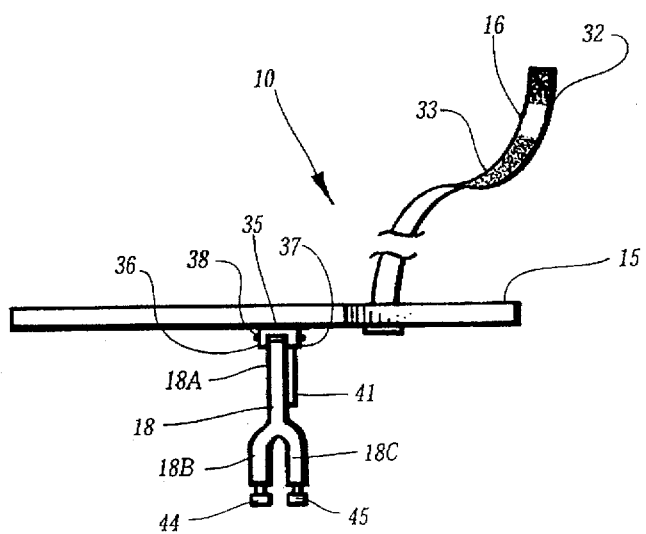
FIG. 3 is a front elevational view of the platform assembly.

When the pivot arm 41 is fully extended as shown in FIGS. 1, 2, and 5, the support leg 18 is positioned about 100 degrees relative to the bottom side of the platform 15. This furthers the stability of the platform 15 on the seat bottom 11. Moreover, this angle may be adjusted as desired by the user of the platform assembly 10.

As shown in FIG. 4, the bottom ends 18B and 18C of the support leg 18 include internally-threaded openings 42 and 43 for receiving complementary threaded end portions of respective feet 44 and 45. The end portion of each foot 44, 45 is approximately 8–12 cm long and is screwed inwardly and outwardly to provide height adjustment of the support leg 18. The adjustable feet 44, 45 and strap 16 thereby cooperate to permit relatively precise leveling and increased stability of the platform 15 on the seat "S". Preferably, the feet 44, 45 and strap 16 are adjusted to support the platform 15 slightly above the top surface of the seat bottom 11.

In an alternative application, the platform assembly 10 may be used in the back seat of a vehicle by a vehicle passenger, or in combination with other conventional chairs. Furthermore, the platform assembly 10 is usable in other moving vehicles such as trains and airplanes.

A platform assembly for a vehicle seat is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. In combination with a vehicle including a vehicle seat having a seat bottom, seat back, and a head rest, and a cellular telephone assembly including a mounting structure attached to a floor of the vehicle adjacent to the vehicle seat and a telephone supported thereon, a platform assembly supported by the seat to carry articles for ready access by an occupant of the vehicle, said platform assembly comprising:

(a) a platform defining a cut-out section therein to accommodate said mounting structure and telephone, and having a flat slip-resistant surface area for supporting articles thereon, and for preventing substantial shifting of the articles while the vehicle is in motion; and (b) an adjustable attachment strap secured to a back end of said platform, and extending upwardly from said platform adjacent to the seat back for removable attachment to the headrest, said attachment strap permitting leveling adjustment of the platform, and unobstructed access by the vehicle occupant to the articles supported on the platform.

2. A combination according to claim 1, and comprising a slot formed in the back end of said platform for receiving an end of said attachment strap, the slot being off-set from a center of said platform, and said attachment strap providing enhanced support and stability in an area forward of said slot for carrying articles for ready access by the occupant.

3. A combination according to claim 1, wherein said platform comprises a raised border for holding the articles on the platform while the vehicle is in motion, and for preventing any loose articles from rolling off the platform.

4. A combination according to claim 1, and comprising a vertical leg connected to a bottom side of said platform at a front end thereof for being positioned on a floor of the vehicle.

5. A combination according to claim 4, and comprising pivot means for pivotally connecting the vertical leg to the bottom side of the platform.

6. A combination according to claim 4, and comprising a vertically adjustable foot connected to a bottom end of said leg for adjusting the height of said leg, and for cooperating with said strap to provide further leveling adjustment of the platform.

* * * * *